United States Patent
Bogale et al.

(10) Patent No.: US 8,592,503 B2
(45) Date of Patent: Nov. 26, 2013

(54) AQUEOUS MAGENTA INKJET INK COMPOSITION CONTAINING A MIXTURE OF A SELF-DISPERSED PIGMENT AND A XANTHENE DYE

(75) Inventors: Rahel Bekru Bogale, Lexington, KY (US); Agnes Kam Zimmer, Lexington, KY (US)

(73) Assignee: Funai Electric Co., Ltd., Osaka (JP)

( * ) Notice: Subject to any disclaimer, the term of this patent is extended or adjusted under 35 U.S.C. 154(b) by 71 days.

(21) Appl. No.: 13/433,330

(22) Filed: Mar. 29, 2012

(65) Prior Publication Data

US 2013/0261219 A1 Oct. 3, 2013

(51) Int. Cl.
*C09D 11/00* (2006.01)

(52) U.S. Cl.
USPC .......... 523/161; 523/160; 523/122; 106/493; 106/31.27; 106/31.33

(58) Field of Classification Search
USPC .............. 523/122, 160, 161; 106/493, 31.27, 106/31.33
See application file for complete search history.

(56) References Cited

U.S. PATENT DOCUMENTS

| | | | | |
|---|---|---|---|---|
| 5,254,160 A * | 10/1993 | Beach et al. | | 106/31.51 |
| 5,583,553 A * | 12/1996 | Shirota et al. | | 347/100 |
| 5,981,623 A * | 11/1999 | McCain et al. | | 523/160 |
| 6,225,370 B1 | 5/2001 | Suthar | | |
| 6,503,317 B1 * | 1/2003 | Ortalano et al. | | 106/493 |
| 6,538,049 B1 * | 3/2003 | Kappele et al. | | 523/161 |
| 6,638,350 B2 | 10/2003 | Butler | | |
| 6,652,634 B1 | 11/2003 | Akers, Jr. | | |
| 6,706,100 B2 * | 3/2004 | Mafune et al. | | 106/31.27 |
| 6,706,104 B2 * | 3/2004 | Takuhara et al. | | 106/31.6 |
| 6,843,838 B2 | 1/2005 | Zimmer | | |
| 6,843,839 B2 * | 1/2005 | Kanke et al. | | 106/31.47 |
| 7,001,936 B2 | 2/2006 | Akers, Jr. | | |
| 7,011,701 B2 * | 3/2006 | Iwamoto et al. | | 106/31.47 |
| 7,056,375 B2 * | 6/2006 | Potenza et al. | | 106/31.5 |
| 7,066,991 B2 | 6/2006 | Blease | | |
| 7,083,667 B2 * | 8/2006 | Murai et al. | | 106/31.43 |
| 7,125,446 B2 * | 10/2006 | Potenza et al. | | 106/31.5 |
| 7,195,664 B2 * | 3/2007 | Mafune et al. | | 106/31.27 |
| 7,429,293 B2 | 9/2008 | Cai | | |
| 7,572,326 B2 * | 8/2009 | Choy et al. | | 106/31.43 |
| 7,582,149 B2 * | 9/2009 | Link et al. | | 106/31.48 |
| 7,608,140 B2 * | 10/2009 | Link et al. | | 106/31.48 |
| 7,976,147 B2 * | 7/2011 | Rao et al. | | 347/100 |
| 8,188,158 B2 | 5/2012 | Bertelsen | | |
| 8,282,723 B2 * | 10/2012 | Holloway et al. | | 106/31.58 |
| 2002/0011178 A1 * | 1/2002 | Kanke et al. | | 106/31.47 |
| 2002/0050225 A1 * | 5/2002 | Mafune et al. | | 106/31.27 |
| 2002/0093557 A1 * | 7/2002 | Takuhara et al. | | 347/100 |
| 2004/0048745 A1 | 3/2004 | Kitamura | | |
| 2004/0074418 A1 * | 4/2004 | Mafune et al. | | 106/31.27 |
| 2004/0123772 A1 * | 7/2004 | Zimmer et al. | | 106/31.27 |
| 2005/0178289 A1 * | 8/2005 | Murai et al. | | 106/31.43 |
| 2005/0187312 A1 | 8/2005 | Akers, Jr. | | |
| 2006/0048673 A1 * | 3/2006 | Potenza et al. | | 106/31.48 |
| 2006/0107868 A1 * | 5/2006 | Potenza et al. | | 106/31.5 |
| 2007/0043144 A1 | 2/2007 | House | | |
| 2007/0078199 A1 | 4/2007 | Winkler | | |
| 2007/0100024 A1 * | 5/2007 | Gu et al. | | 523/160 |
| 2008/0257203 A1 * | 10/2008 | Choy et al. | | 106/31.13 |
| 2009/0068417 A1 | 3/2009 | Saito | | |
| 2009/0181170 A1 * | 7/2009 | Link et al. | | 427/256 |
| 2009/0205533 A1 * | 8/2009 | Link et al. | | 106/31.48 |
| 2010/0003409 A1 * | 1/2010 | Rao et al. | | 427/288 |
| 2010/0285219 A1 | 11/2010 | Cai | | |
| 2011/0014375 A1 * | 1/2011 | Holloway et al. | | 427/256 |
| 2011/0014376 A1 * | 1/2011 | Sisk et al. | | 427/256 |
| 2012/0019588 A1 * | 1/2012 | Mubarekyan | | 347/20 |

* cited by examiner

*Primary Examiner* — James J Seidleck
*Assistant Examiner* — Peter A Salamon
(74) *Attorney, Agent, or Firm* — Amster, Rothstein & Ebenstein LLP

(57) ABSTRACT

The invention relates to an aqueous magenta inkjet ink composition for use in ink jet printers comprising a mixture of a self-dispersed magenta pigment surface modified with functional group and a xanthene dye. The magenta ink of the present invention also contains an aqueous carrier, a polymeric additive, a surfactant, and a specific cosolvent mixture selected from the group consisting of a $C_2$-$C_8$ terminal alkanediol, cyclic amide compound and its derivative, trihydric alcohol and mixtures thereof. Preferably, the magenta pigment is surface modified with bisphosphonate or sulfonate group, most preferably bisphosphonate group. The magenta inkjet ink demonstrates excellent stability, good chroma and maintenance characteristics and high heater reliability in permanent and semi permanent printheads. The ink also reduced post print paper curl without sacrificing print quality.

12 Claims, No Drawings

AQUEOUS MAGENTA INKJET INK COMPOSITION CONTAINING A MIXTURE OF A SELF-DISPERSED PIGMENT AND A XANTHENE DYE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

The present invention pertains to a magenta ink for inkjet printing and in particular to a magenta ink having a mixture of specific magenta colorants including a self-dispersed magenta pigment and a xanthene dye. The self-dispersed magenta pigment is defined as a magenta pigment surface modified with bisphosphonate functional group or sulfonate functional group.

Ink jet printing is accomplished by ejecting ink from a nozzle toward paper or another print medium. The ink may be driven toward the medium in a variety of ways. For example, in electrostatic printing, the ink is driven from a nozzle toward a medium by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Ink jet printers are well known. One common type of ink jet printer uses a replaceable print cartridge having a printhead and a supply of ink contained within the cartridge. The printhead is installed in a printhead carrier, which positions the printhead along a printing zone. When the supply of ink contained within the print cartridge is depleted, the print cartridge is disposed of and a new print cartridge is installed in the printhead carrier. In contrast, off-carrier inkjet printers deliver ink through supply tubes connected from a replaceable off-carrier ink supply tank to an ink jet printhead positioned on the printhead carrier. This inkjet printhead is not disposable but permanent or semi-permanent in nature. Naturally consumers expect that these permanent or semi-permanent printheads have a longer life compared to a disposable printhead. When the supply of ink is exhausted, the consumer will purchase a new tank filled with ink as opposed to purchasing a brand new printhead containing the same supply of ink. Purchasing a tank of ink is a more economical option for the consumer. Therefore it is imperative that a permanent or semi-permanent printhead does not fail in their operations prematurely because consumers expect that permanent and semi-permanent printheads will have a longer life compared to a disposable printhead.

Ink being jetted over the life of permanent or semi-permanent printheads can cause many problems which affect the overall performance of the printhead. One of the most common problems is kogation. During the millions of firing of ink drops from the printhead, the layer of ink covering the surface of the heating element of the printhead can reach a very high temperature, usually over 300° C. At this high temperature, ink can decompose, thereby depositing a residue onto the surface of the heater. This phenomenon is called kogation. The presence of this residue negatively affects the volume, mass, shape and velocity of each ejected drop of ink jetted from the printhead, thereby reducing the quality and the expected life of a thermal inkjet printhead. A loss of drop mass over the life of the printhead negatively reduces the accuracy of drop placement onto the print media. In extreme cases, kogation causes the printhead to stop working altogether. Therefore, it is necessary to have an ink that does not cause the undesirable kogation in a printhead.

Another important factor considered when formulating inks is reduced idle time. Idle time is used to measure the short term reliability of an ink. Idle time is measured as the time between nozzle firings just before the printhead produces delayed or misdirected ink droplets. It affects the maintenance algorithm of the printer which in turn affects the through-put and how much ink will be used during the maintenance of the printhead. Often magenta inks exhibit poor idle time.

Post print paper curl is also an issue, especially during fast speed printing. The use of water in high concentrations in inkjet ink formulations induces the water to negatively react with the paper, thereby causing the edges of the paper to migrate towards the center of the paper. Curl may appear immediately after printing or it may take a couple of days to manifest itself. In its final state, the paper may curl so much that it resembles a roll, scroll or a tube. Curled paper cannot be stacked nor can it successfully be duplexed in a print job.

In order to reduce paper curl it is helpful to understand the mechanism of paper curl and determine which particular ink components have an effect on this paper curl. Media tends to curl after a large quantity of ink is deposited onto the surface of the printing substrate. Plain paper substrates are comprised mainly of cellulose fibers, along with varying levels of inorganic fillers. It is the interaction of the water in the inkjet inks with these cellulose fibers that leads to the phenomenon of paper curl. The absorption of water by the cellulose fibers causes swelling and then breaking of the interfiber cellulose bonds in the paper.

Upon drying there are differential stresses between the printed and non-printed surfaces. These differential stresses manifest themselves as paper curl, whereby the substrate tends to curl towards the surface from which moisture was last removed (the imaged surface). An ink formulation with a reduced level of water in addition to humectants with high boiling points effectively eliminates the typical end user problems of stacking and displaying printed images with acceptable levels of paper curl.

Ink formulations used in ink jet printers comprise either a soluble dye or an insoluble pigment. Unfortunately, inks comprising soluble dyes can exhibit many problems, such as poor water-fastness, poor light-fastness, clogging of the jetting channels as a result of solvent evaporation and changes in the dye's solubility, dye crystallization, poor print quality including ink bleeding and feathering, poor thermal stability, chemical instability, and ease of oxidation.

Pigmented inks are also not problem free. For example, insoluble pigments must be present in the ink as a dispersion. Unfortunately, traditional polymer dispersed pigmented ink is not vibrant due to its penetration into fibers on plain and Colorlok® papers. Another problem with pigmented ink is the propensity of the ink particles to settle during storage. This can lead to clogged nozzles and poor print quality.

As discussed above, it has been very difficult to develop a magenta ink formulation which optimizes all of these desired ink printing properties simultaneously. Therefore, many trade-offs arise when trying to formulate an acceptable magenta ink formulation. Often the inclusion of an ink component meant to fix and or control one of the above discussed problems can prevent another printing property from being met.

Prior to the present invention, however, an ink formulation which optimizes all of these desired ink printing properties had not been achieved. For example, increasing the pigment load in the inkjet ink formulation improves the optical density and gamut of the ink but it also has a negative impact on jetting and heater kogation. Many solvents help kogation but they negatively increase the viscosity of the ink. A certain viscosity value is vital, especially when the ink is used in an off-carrier printer. Low viscosity is desirable for fluids used in off-carrier printing systems. Moreover, low viscosity also increases the ink penetration and image drying speeds. Usually a desirably magenta ink viscosity at 25 C.° is in the range of 2.5-3.0 cps. However, many solvents and antikogation agents negatively increase the viscosity of the ink. This causes great difficulty in jetting the ink, especially after the printhead is idle, and consequently leads to clogging of the printhead, difficulty in jetting the ink and ultimately to the printhead failing prematurely.

Humectants (also termed cosolvents) can be added to the ink composition to aid in maintaining the colorant in the ink composition and to enhance the performance of the ink. However, often the addition of particular humectants can negatively impact the print quality of the ink. Unfortunately, high quantities of humectants adversely affect the magenta ink in terms of viscosity, dry time and smudging. Consequently, there is a need to balance these competing factors when deciding exactly which components to include and at what percentage each component should be used in a magenta ink formulation, wherein the ink formulation would minimize kogation and paper curl and improve idle time while still having acceptable print quality and print properties. The magenta inkjet ink of the present invention balances these many trade-offs to formulate an optimized magenta inkjet ink formulation.

The magenta ink of the present invention uses a particular combination of magenta colorants which surprisingly produces an optimal ink formulation which minimizes kogation and paper curl and improve idle time while still having acceptable print quality and viscosity. With the increased usage of off carrier inkjet printing systems having permanent and semi-permanent printheads, this type of magenta inkjet ink formulation is greatly needed.

It has now been discovered that the use of a very specific mixture of magenta colorants including a pigment surface modified with a particular functional group and a xanthene magenta dye provides a unique blend of optimized properties needed and desired for a magenta pigmented ink. This magenta ink composition provides excellent printing properties in terms of stability, optical density (even when low levels of pigment are utilized), viscosity, paper curl, printing characteristics (water-fastness, minimized feathering, minimized running of ink on the printed page), and printer maintenance problems (i.e., minimized clogging of the printhead during gaps in printer usage).

It is, therefore, an object of the present invention to provide an improved magenta pigmented ink composition for ink jet printers having optimal chroma, gamut value and viscosity while simultaneously reducing paper curl and kogation and improving idle time. The magenta inkjet ink of the present invention is especially suitable for use in permanent or semi permanent printheads. Other objects and advantages of the present invention will become apparent from the following disclosure.

SUMMARY OF THE INVENTION

The present invention relates to a magenta ink composition suitable for use in ink jet printers comprising a specific mixture of two magenta colorants including a self dispersed magenta pigment and a xanthene magenta dye. In particular, the self dispersed magenta pigment is surface modified with either bisphosphonate group or a sulfonate group. Most preferred is a magenta pigment surface modified with bisphosphonate group. The magenta ink of the present invention is also formulated with a surfactant, a specific mixture of humectants selected from the group including trihydric alcohol or a mixture of trihydric alcohols, terminal alkanediol or a mixture of terminal alkanediols and cyclic amide compound or a mixture of cyclic amide compounds, a polymeric additive and the balance an aqueous carrier. Optionally, the magenta inkjet ink of the present invention may contain a biocide.

All percentages used herein are "by weight" unless otherwise specified and are based on the overall magenta inkjet ink composition. All molecular weights, used herein, are number average molecular weights unless otherwise specified.

DETAILED DESCRIPTION OF THE INVENTION

The first component of the magenta ink composition of the present invention is the self-dispersed magenta pigment. The magenta self-dispersed pigment is present in the inkjet ink composition of the present invention at from about 1.0% to about 10.0%, most preferably about 4.5% of the total magenta inkjet ink composition. Indeed, one of the important advantages of the present invention is that it allows formulation of inks having low levels of pigment (e.g., between 0.5% and 5.0%) while still providing print of high quality and excellent optical density.

Pigments known as self-dispersed pigments of self-dispersing pigments are created with a surface modification. Such pigments can be surface modified in a variety of ways including, but not limited to, treatments with alkali salts of hypochlorite, ozone, and diazonium salts of aromatic sulfonic acid additions. These surface modified pigments have the distinct advantage of being self-dispersed in aqueous media and can be used without a corresponding polymeric dispersing agent. U.S. Publication 2007/0100024 describes a preferred method of making a self-dispersed magenta pigment having or surface modified with bisphosphonate functional group and the disclosure is incorporated by reference. Commercially available magenta pigments surface modified with bisphosphonate functional group are manufactured by Cabot Corporation. Another useful self-dispersed pigment is surface modified with sulfonate group. Particularly preferred is Cab-O-Jet® 465M and Cab-O-Jet® 265M. The type of magenta pigment modified with bisphosphonate group is the most preferred.

To further enhance color and print quality, a small amount of a particular type of magenta dye is added to the magenta ink formulation. Having small amounts of dye helps wet the paper fiber, thus improving paper fiber show through. This leads to a better red color which is a desired by customers. Table 1 compares color data of a magenta ink formulated with and without a dye. Higher chroma value (or C*) indicates high color vibrancy and is desirable. The gamut volume of the magenta ink with the dye is also compared to the magenta ink without dye. A higher gamut volume is also desirable. It can be seen that the addition of the magenta dye to the magenta ink formulation improves the chroma and gamut volume of the magenta ink.

TABLE 1

| # | Ink Description | Gamut volume | | Magenta C* (chroma) | |
|---|---|---|---|---|---|
| | | Plain Paper | Plain Paper with Colorlok ® | Plain Paper | Plain Paper with Colorlok ® |
| Ink A | Self dispersed Magenta ink without dye | 192K | 221K | 61.8 | 65.6 |
| Ink B | Self dispersed Magenta ink with dye | 207K | 245K | 65.1 | 69.7 |

| Ink A Formulation | | Ink B Formulation | |
|---|---|---|---|
| Cabot ® 465M magenta colorant | 4.5% | Cabot ® 465M magenta colorant | 4.5% |
| | | AR289 dye | 0.2% |
| Polymeric additive | 0.8% | Polymeric additive | 0.8% |
| 1,3-propanediol | 11.0% | 1,3-propanediol | 11.0% |
| Glycerol | 3.2% | Glycerol | 3.2% |
| 1-(2-hydroxyethyl)-2-Pyrrolidone | 5.0% | 1-(2-hydroxyethyl)-2-Pyrrolidone | 5.0% |
| Trimethylolpropane | 0.8% | Trimethylolpropane | 0.8% |
| Surfynol ® 465 | 0.8% | Surfynol ® 465 | 0.8% |
| Biocide | 0.15% | Biocide | 0.15% |
| DI Water | balance | DI Water | balance |

The selection of a particular type of magenta dye to add to self-dispersing magenta pigment ink can impact jetting or other print quality and consequently require extensive compatibility testing. Inventors have discovered a unique dye chemistry and ratio that results in a magenta ink having a high reliability in the printing process while not sacrificing color quality. This particular magenta dye is a xanthene dye. A xanthene dye refers to any dye comprising a dibenzopyran central structure. Dyes comprising a dibenzopyran structure include fluoroscien, eosin and rhodamine dyes, most preferred is a rhodamine dye. Examples of xanthene dyes comprising a rhodamine dye include but are not limited to C.I. Basic Red 1, C.I. Acid Red 51, 52 and 289 and Rhodamine B. dyes. C.I. Acid Red 51, 52 and 289 may be purchased from various commercial vendors including Aldrich Chemical Company and Sensient Technologies Corporation. The weight of the xanthene dye to the self-dispersed magenta pigment ranges from about 1:0.01 to about 1:0.1. In the preferred embodiment, the weight ratio of the xanthene dye to the self-dispersed pigment is about 1:0.04. In an embodiment of the invention, the xanthene dye comprises at least one of Acid Red 51, 52 or Acid Red 289, or mixtures thereof. In the preferred embodiment, the xanthene dye is Acid Red 289. The amount of Acid Red 289 to be used in the magenta inkjet ink formulation of the present invention is from about 0.05% to about 1.0%, most preferably about 0.2%.

Table 2 shows that the addition of the xanthene magenta dye, AR289, not only gives the best chroma (C*) on paper, but also has excellent jetting characteristics when compared to other magenta ink formulations having other types of magenta dyes.

TABLE 2

| % Dyes in Magenta Ink formulation | C* on plain paper | C* on Colorlok ® paper | Print head jetting |
|---|---|---|---|
| 0.2% Lexmark LMD-321 | 60.74 | 60.3 | Poor |
| 0.5% Lexmark LMD-321 | 61.25 | 60.13 | Poor |
| 0.2% Lexmark 93A | 62.46 | 62.28 | Poor |
| 0.5% Lexmark 93A | 63.6 | 65.52 | Poor |
| 0.2% Nippon Mag LM-1 | 61.12 | 62.76 | Poor |
| 0.5% Nippon Mag LM-1 | 62.19 | 62.84 | Poor |
| 0.2% AR289 | 64.71 | 66.87 | Excellent |
| 0.5% AR289 | 67.87 | 69.56 | Excellent |

The addition of a small amount of a polymeric additive is found useful in the magenta inkjet ink formulation. Polymeric additives suitable for use in the present invention include any of the anionic, cationic or nonionic polymers known in the art as suitable for use as polymeric additive in ink jet ink preparations. The amount of the polymeric additive added to the ink formulation must not negatively affect properties of the ink such as viscosity, stability and optical density. The magenta ink composition of the present invention contains a polymeric additive in the amount from about 0.5% to about 2.0%, most preferably about 0.8%, based on the overall total weight of the magenta inkjet ink composition.

The polymeric additive is a graft co-polymer, preferably a ter-polymer made by a free radical polymerization process. It preferably contains three monomers or components: namely a hydrophilic component, a hydrophobic component and a protective colloid component. The ratio of the three monomers can vary. The preferred ratio of the hydrophilic component:the hydrophobic component:the protective colloid component can range from 5:1:1 to 40:2:1, preferably 6.2:1:1, most preferably, 15:1:1. This polymeric additive and its polymerization is more particularly described in U.S. Pat. Nos. 6,652,634 and 6,896,724 assigned to the assignee of the present invention.

The hydrophilic component of the polymeric additive is preferably an ionic monomer segment which may be selected from acrylic acid, methacrylic acid, crotonic acid, or other acid containing monomers. The hydrophilic segment preferably provides polymeric additive electrostatic stability. Particularly preferred is a methacrylic acid (MAA).

The hydrophobic component of the polymeric additive preferably contains non-polar functionality. Preferred groups that provide the electron rich functional groups include nonylphenyl, mono-, di-, and tri-styrene phenol, polydimethylsiloxy, and stearyl. Examples of such monomers include, but are not limited to, polymerizable monofunctional vinyl monomers from Toagosei Co. of Tokyo, Japan under the trade name Aronix M-117, mono-methacryloxypropyl terminated polydimethylsiloxane from Chisso Corporation of Tokyo, Japan. Non-siloxyl hydrophobic monomers may be derived from long chain aliphatic groups, long chain alcohols, and alkyl aryl alcohols. Examples of such materials preferably include stearyl or methacrylate or nonyl phenol acrylate or methacrylate. The most preferred hydrophobic component is polypropylene glycol nonylphenyl ether acrylate sold commercially by Toagosei Co. under the trade name Aronix M-117.

Another important component of the polymeric additive is the protective colloid component. This component provides extra stability to the ter-polymer in an aqueous system. Use of this component substantially reduces the amount of ionic monomer component needed, thereby increasing the nonionic water solubility of the polymeric additive. Preferred protective colloid segment is poly (ethylene glycol) 2,4,6-tris-(1-phenylethyl)phenyl ether methacrylate (Sipomer SEM-25) and its di and mono derivatives wherein the alkylene group contains from 3 to 10 carbon atoms. This type of monomer is commercially available from Rhodia, USA of Cranbury, N.J. under the trade name SIPOMER/SEM 25.

A particularly useful polymeric additive available from Lexmark International®, Inc. is an acrylic terpolymer having moieties of methacrylic acid (MAA); poly (propylene glycol)-4-nonylphenyl ether acrylate (Aronix M-117); and poly (ethylene glycol)2,4,6-tris-(1-phenylethyl)phenyl ether methacrylate (Sipomer SEM-25). In exemplary embodiments, the molar ratio of MAA:Aronix M-117:Sipomer SEM-25 ranges from 4:1:1 to 40:2:1. In the most preferred embodiment, the molar range of the MAA:Aronix M-117: Sipomer SEM-25 is 15:1:1. Alternatively, the ratio of MAA: Aronix M-117:Sipomer SEM-25 is 6.2:1:1. This polymeric additive and its polymerization is more particularly described in U.S. Pat. Nos. 6,652,634 and 6,896,724 assigned to the assignee of the present invention and the disclosures in their entirety are herein incorporated by reference.

Another useful polymer dispersant is a graft polymer having both an anionic hydrophilic monomer and a hydrophobic aromatic monomer. The hydrophilic monomer can be any carboxylic acid containing vinyl, acrylic or methacrylic molecule which is typically used in radical polymerization. Examples are methacrylic acid or acrylic acid. The hydrophobic monomer can be any phenyl containing monomer of the type including acrylic, methacrylic, vinyl or styrene that is typically used in radical polymerization. An exemplary polymeric additive of this type is a copolymer manufactured by Lexmark International®, Inc. using methacrylic acid for the hydrophilic component and benzyl methacrylate for the hydrophobic component. The molar ratio of the methacrylic acid to the benzyl methacrylate is 1:1. Another useful polymeric additive is a terpolymer using styrene and alpha-methyl styrene in the hydrophobic component and acrylic acid in the hydrophilic component of the terpolymer. This terpolymer is sold by BASF Company under the trade name Joncryl® HPD 671. Another useful polymeric additive, manufactured by Lexmark International®, Inc. is described in U.S. Pat. Nos. 5,714,538 and 5,719,204 assigned to the assignee of this invention.

Another component of the magenta inkjet ink composition is a surfactant added to adjust the surface tension of the ink. The surfactant can be anionic, or nonionic. The surfactant is present at a level of about 0.1% to about 3.0%, most preferably about 0.8%, based on the overall total weight of the magenta inkjet ink composition. Suitable surfactants include, but are not limited to those of the Triton® and Tergitol® series (Dow Chemical Corporation); those of the Surfynol® series and Dynol Series® (Air Products, Inc.); and those of the Iconol® series (BASF Co.). The most preferred surfactant is ethoxylated 2,4,7,9-tetramethyl-5decyn-4,7-diol sold under the trade name Surfynol®465. Other desired chemical additives such as biocides, pH buffers, chelating agents (EDTA) and the like can also be optionally used in the magenta ink of the present invention.

The magenta ink of the present invention also contains a specific humectant or cosolvent mixture, present in the amount of about 15.0% to about 25.0%, most preferably about 20.0% based on the overall total weight of the magenta inkjet ink composition. The preferred or specific humectants mixture is selected from the group consisting of $C_2$-$C_8$ terminal alkanediol, trihydric alcohol, and cyclic amide compound and mixtures thereof.

The preferred cosolvent mixture contains a first component comprising one $C_2$-$C_8$ terminal alkanediol. A $C_2$-$C_8$ terminal alkanediol is defined to mean a diol having hydroxyl groups at each end like, for example, an alkanediol having the formula:

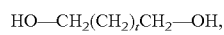
$$HO-CH_2(CH_2)_tCH_2-OH,$$

wherein t is about 0 to about 6.

Suitable terminal alkanediols include 1,3-propanediol, 1,4-butanediol, 1,5-pentanediol, 1,6-hexanediol, 1,7-heptanediol and mixtures thereof. The most preferred terminal alkanediol is 1,3-propanediol. The amount of the terminal alkanediol to be used is from 5.0% to 15.0%, most preferably about 11.0%, based on the total weight of the magenta inkjet ink composition.

The second component of the unique cosolvent mixture comprises a trihydric alcohol or a mixture of trihydric alcohols. Some examples of trihydric alcohols include glycerol, trimethylolpropane, 1,2,4-butanetriol, 1,3,5-(3-methyl)-pentanetriol, and 1,2,6-hexanetriol. The total amount of the trihydric alcohol or mixtures thereof to be used is from 1.0% to 10.0%, most preferably about 4.0%, based on the total weight of the magenta inkjet ink composition. Inventors have discovered that having a mixture of glycerol and trimethylolpropane results in a magenta ink having good print quality. The amount of the glycerol to be used is from 2.0% to 5.0%, most preferably about 3.2% based on the total weight of the magenta ink composition. The amount of the trimethylolpropane to be used is from 0.5% to 1.5%, most preferably about 0.8% based on the total weight of the magenta ink composition.

The third component of the unique cosolvent mixture comprises a cyclic amide compound such as cyclic amides, substituted cyclic amides and cyclic amide derivatives. The cyclic amide compound may be selected from the group consisting of 2-pyrrolidone, 1-methyl-2-pyrrolidine, 1,5-dimethyl-pyrrolidone, 1-ethyl-2-pyrrolidone, 1-propyl-2-pyrrolidone, 1-isopropyl-2 pyrrolidone, 1-butyl-2-pyrrolidone, 1-(2-hydroxyethyl)-2-pyrrolidone, 1-methyl-2-piperidone, 1-methylcaprolactum, oenantholactum and mixtures thereof. One useful cyclic amide compound is 2-pyrrolidone. The most preferred cyclic amide compound is 1-(2-hydroxyethyl)-2-pyrrolidone. The amount of the cyclic amide compound to be used is from 3.0% to 10.0%, most preferably about 5.0%, based on the total weight of the magenta inkjet ink composition.

The balance of the magenta inkjet ink of the present invention is an aqueous carrier medium, usually water, preferably deionized water. The magenta inkjet ink formulation may optionally contain a biocide.

The magenta ink composition of the present invention may be prepared by any method known in the art for making such compositions. In one embodiment, the ink is prepared as follows.

1, Premix the polymeric additive with DI water by mechanical stirring until mixture is homogeneous for at least 10 minutes.
2. Add the cosolvents and surfactants while stirring and mix for 20 minutes.
3. Slowly add the magenta pigment dispersion while stirring and mix for 20 minutes.
4. Slowly add the dye solution while mixing and mix for 15 minutes after addition.

5. Biocides and optional additives at their art-established levels to achieve their art known benefits can be added.
6. Filter the final ink to 1 um using depth style filters constructed of polypropylene.

The following examples are detailed descriptions of methods of preparation and use of the ink compositions of the present invention. The detailed descriptions fall within the scope of, and serve to exemplify, the more general description set forth above. The examples are presented for illustrative purposes only, and are not intended as a restriction on the scope of the invention.

Magenta ink compositions having the mixture of a self-dispersed pigment in combination with a xanthene dye demonstrate optimal printing properties while simultaneously reducing paper curl and kogation and improving idle times. Magenta inkjet inks were formulated as outlined in Table 3 Ink #1 is the inventive magenta ink of the present invention.

TABLE 3

| Ink Components | Ink #1 | Ink #2 | Ink #3 | Ink #4 | Ink #5 | Ink #6 | Ink #7 |
|---|---|---|---|---|---|---|---|
| 1-(2-hydroxyethyl)-2-Pyrrolidone | 5.0% | 5.0% | 5.0% | 5.0% | 5.0% | 5.0% | |
| 1,3 propanediol | 11.0% | | 15.0% | 11.0% | 11.0% | 4.2% | 10.0% |
| Trimethylpropane | 0.8% | 0.8% | | 3.0% | | 0.8% | |
| Glycerol | 3.2% | 14.2% | | 1.0% | 4.0% | 10.0% | 5.0% |
| Triethylene glycol | | | | | | | 5.0% |
| Polymeric additive | 0.8% | 0.8% | 0.8% | 0.8% | 0.8% | 0.8% | 0.8% |
| Surfynol ® 465 | 0.8% | 0.8% | 0.8% | 0.8% | 0.8% | 0.8% | 0.8% |
| Biocide | 0.15% | 0.15% | 0.15% | 0.15% | 0.15% | 0.15% | 0.15% |
| Cab-O-Jet ® 465M magenta colorant | 4.5% | 4.5% | 4.5% | 4.5% | 4.5% | 4.5% | 4.5% |
| AR289 | 0.2% | 0.2% | 0.2% | 0.2% | 0.2% | 0.2% | 0.2% |
| DI Water | Balance | Balance | Balance | Balance | Balance | Balance | Balance |

The inks prepared in Table 3 were tested for their performance in different categories and Tables 4 and 5 lists the results of these tests.

TABLE 4

| Test Results | Ink #1 | Ink #2 | Ink #3 | Ink #4 | Ink #5 | Ink #6 | Ink #7 |
|---|---|---|---|---|---|---|---|
| Idle Time (sec) | 3.5 | 2.1 | 1.5 | 2.3 | 2.4 | 1.6 | 1.1 |
| Uncap Startup | Good | Good | Poor | Poor | Poor | Good | Poor |
| Print Quality | Good | Good | Good | Good | Good | Good | Poor |
| Ink Viscosity @ 25 CP | 2.84 | 2.85 | 2.83 | 2.87 | 2.82 | 2.82 | 2.85 |

TABLE 5

| TIME (minutes) | POST PRINT CURL (mm) INK 1 | POST PRINT CURL (mm) INK 7 |
|---|---|---|
| 0 | 7 | 5.8 |
| 10 | 17.8 | 18.2 |
| 20 | 17.8 | 21 |
| 30 | 17.8 | 21.6 |
| 40 | 17.8 | 22.8 |
| 60 | 17.6 | 25.1 |
| 120 | 18.1 | 30.6 |
| 240 | 18.5 | 36.5 |

The first category tested was 'Idle Time' which is measured as the maximum time for a nozzle to idle before failing and producing a print quality defect. Higher numbers are desired for idle times. As can be seen in Table 4, the inventive magenta ink (Ink 1) has an acceptable idle time. Another category tested was 'Uncap Startup'. A rating of 'Poor' in the Uncap Startup test means that more than 50.0% of the nozzles are plugged with dried ink, thereby making it more difficult to recover or clear the nozzles with ink purging. A rating of 'Good' in the Uncap Startup test means that less than 50.0% of the nozzles are missing or plugged with dried ink, thereby making it easy to recover or clear the nozzles with ink purging. A rating of 'Average' in the Uncap Startup test means that more than 50.0% of the nozzles are plugged with dried ink but it is easy to unclog the nozzles by purging with fresh ink. As can be seen from Table 4, the inventive magenta ink of the present invention passes the Uncap Startup test.

Prior art polymer dispersed magenta pigment inks have high viscosity (>3.5 c.p @25 C) Inks having these high viscosity values do not work for a printer with an offline ink carrier system. Moreover, this high viscosity leads to poor print quality including as poor fiber show-through. However, it can be seen in Table 4 that the magenta ink of the present invention has excellent viscosity value and print quality.

As indicated by Table 4, the magenta ink of the present invention exhibits optimal printing properties and idle times while also reducing clogging and extending the life of the printhead. The magenta inkjet ink of the present invention is especially suitable for use in permanent or semi permanent printheads.

Another test performed was 'Paper Curl'. Paper curl occurs when the fibers within a sheet of paper expand or contract unevenly as the ink dries. This uneven shrinkage or expansion produces a bent or curled paper structure. Ink formulation is one of the most important variables of paper curl. The paper curl experiment began by studying two important factors: the print out of the image on the paper and the type of paper involved (plain, Colorlok® and recycled). The testing of paper curl determined that the worst and consistent curl was found on the Hammermill® Laser Print paper having a heavy coverage image printed thereon. The inventive magenta ink (listed as Ink #1 on Table 5), was tested for paper curl against ink #7. Lower curl numbers in millimeters are desired. Results show that the inventive magenta ink has a reduction in paper curl by almost 50.0% when compared to Ink 7.

What is claimed is:

1. An aqueous magenta inkjet ink composition for use in ink jet printers comprising:
   (a) from about 1.0% to about 10.0% by weight, based on the total weight of the magenta inkjet ink composition, of self-dispersed magenta pigment;
   (b) from about 0.05% to about 1.0% by weight, based on the total weight of the magenta inkjet ink composition, of a xanthene dye selected from the group consisting of Acid Red 51, 52 and 289;
   (c) from about 0.5% to about 2.0% by weight, based on the total weight of the magenta inkjet ink composition, of a polymeric additive;
   (d) from about 0.1% to about 3.0% by weight, based on the total weight of the magenta inkjet ink composition, of a surfactant;
   (e) from about 15.0% to about 25.0% by weight, based on the total weight of the magenta inkjet ink composition, of a cosolvent mixture having:
      (1) a $C_2$-$C_8$ terminal alkanediol or a mixture thereof;
      (2) a cyclic amide compound and its derivative or a mixture thereof;
      (3) a trihydric alcohol or a mixture thereof; and
   (f) the balance an aqueous carrier,
wherein the ink has excellent print quality, idle times, and long heater reliability.

2. The aqueous magenta inkjet ink composition according to claim 1 wherein the self-dispersed magenta pigment is surface modified with bisphosphonate group.

3. The aqueous magenta inkjet ink composition according to claim 1 wherein the cosolvent mixture comprises:
   (1) 1,3 propanediol present in the amount of about 11.0%, based on the total weight of the magenta inkjet ink composition;
   (2) 1-(2-hydroxyethyl)-2-pyrrolidone present in the amount of about 5.0%, based on the total weight of the magenta inkjet ink composition; and
   (3) a mixture of glycerol and trimethylolpropane, wherein the glycerol is present in the amount of about 3.2% and the trimethylolpropane is present in the amount of about 0.8%, based on the total weight of the magenta inkjet ink composition.

4. The aqueous magenta inkjet ink composition of claim 1 wherein the surfactant is ethoxylated 2,4,7,9-tetramethyl-5-decyn-4,7-diol and is present in the amount of about 0.8%, based on the total weight of the magenta inkjet ink composition.

5. The aqueous magenta inkjet ink composition of claim 1 wherein the self-dispersed magenta pigment is present in the amount of about 4.5%, based on the total weight of the magenta inkjet ink composition.

6. The aqueous magenta inkjet ink composition of claim 1 wherein the polymeric additive is present in the amount of 0.8%, based on the total weight of the magenta inkjet ink composition.

7. The aqueous magenta inkjet ink composition of claim 1 wherein the polymeric additive contains at least three components: a hydrophilic segment, a hydrophobic segment, and a protective colloid segment.

8. The aqueous magenta inkjet ink composition of claim 7 wherein hydrophilic segment is methacrylic acid, the hydrophobic segment is poly(propylene glycol)-4-nonylphenyl ether acrylate and the protective colloid segment is poly(ethylene glycol)2,4,6-tris-(1-phenylethyl)phenyl ether methacrylate.

9. The aqueous magenta inkjet ink composition of claim 7 wherein molar ratio of the methacrylic acid to the poly(propylene glycol)-4-nonylphenyl ether acrylate to the poly(ethylene glycol)2,4,6-tris-(1-phenylethyl)phenyl ether methacrylate is 15:1:1.

10. The aqueous magenta inkjet ink composition of claim 8 wherein molar ratio of the methacrylic acid to the poly(propylene glycol)-4-nonylphenyl ether acrylate to the poly(ethylene glycol)2,4,6-tris-(1-phenylethyl)phenyl ether methacrylate is 6.2:1:1.

11. The aqueous magenta inkjet ink composition of claim 1 wherein the xanthene dye is Acid Red 289 and is present in the amount of about 0.2%, based on the total weight of the magenta inkjet ink composition.

12. The aqueous magenta inkjet ink composition of claim 1 further comprising a biocide.

* * * * *